(12) United States Patent
Traxler et al.

(10) Patent No.: US 9,944,538 B2
(45) Date of Patent: *Apr. 17, 2018

(54) SYSTEM AND METHOD FOR PURIFYING PROCESS WATER (71) Applicant: Cool Planet Energy Systems, Inc., Greenwood Village, CO (US)

(72) Inventors: Vern S. Traxler, Simi Valley, CA (US); Timothy Alan Thompson, Ventura, CA (US); Paul Faust, Santa Paula, CA (US); Wilson Hago, Camarillo, CA (US)

(73) Assignee: COOL PLANET ENERGY SYSTEMS, INC., Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/976,304

(22) Filed: Dec. 21, 2015

(65) Prior Publication Data

US 2016/0101990 A1 Apr. 14, 2016

Related U.S. Application Data (63) Continuation of application No. 14/063,350, filed on Oct. 25, 2013, now Pat. No. 9,216,916.

(51) Int. Cl.
*C02F 1/28* (2006.01)
*B01J 20/20* (2006.01)
(Continued)

(52) U.S. Cl.
CPC ............. *C02F 1/283* (2013.01); *B01J 20/20* (2013.01); *B01J 20/3078* (2013.01);
(Continued)

(58) Field of Classification Search
None
See application file for complete search history.

(56) References Cited

U.S. PATENT DOCUMENTS 136,942 A 3/1873 Hawley
203,016 A 4/1878 Edison
(Continued)

FOREIGN PATENT DOCUMENTS

CN 1997590 A 7/2007
CN 101805224 8/2010
(Continued)

OTHER PUBLICATIONS

Ahmad, et al., "Blochar as a Sorbent for Contaminant Management in Soil and Water: A Review," Chemosphere, vol. 99, pp. 19-33 (Nov. 27, 2013).
(Continued)

*Primary Examiner* — Chester T Barry
(74) *Attorney, Agent, or Firm* — Wilmer Cutler Pickering Hale and Dorr LLP (57) ABSTRACT

In accordance with one embodiment, a process is described for a water treatment process in which process water is treated with recycled biochar. In accordance with one aspect, process water is passed through activated carbon generated by the biomass pyrolysis and gasification. In accordance with another aspect, the process water is treated to expel gaseous compounds within the process water. In this manner both inorganics, light organics and heavy organics can be removed from the process water. No fermentation is involved.

27 Claims, 4 Drawing Sheets

(51) Int. Cl.
*B01J 20/30* (2006.01)
*C10B 53/02* (2006.01)
*C10J 3/60* (2006.01)
*C10K 1/20* (2006.01)
*C10G 2/00* (2006.01)
*C02F 101/10* (2006.01)
*C02F 101/32* (2006.01)
*C02F 103/36* (2006.01)

(52) U.S. Cl.
CPC ............... *C10B 53/02* (2013.01); *C10G 2/32* (2013.01); *C10J 3/60* (2013.01); *C10K 1/20* (2013.01); *C02F 2101/10* (2013.01); *C02F 2101/32* (2013.01); *C02F 2103/365* (2013.01); *C02F 2303/16* (2013.01); *C10J 2300/0903* (2013.01); *C10J 2300/0913* (2013.01); *C10J 2300/0916* (2013.01); *C10J 2300/169* (2013.01); *C10J 2300/1665* (2013.01); *Y02E 50/14* (2013.01); *Y02E 50/18* (2013.01); *Y02E 50/32* (2013.01); *Y02P 20/129* (2015.11)

(56) References Cited

U.S. PATENT DOCUMENTS

| | | |
|---|---|---|
| 222,390 A | 12/1879 | Edison |
| 474,230 A | 5/1892 | Edison |
| 4,153,514 A | 5/1979 | Garrett et al. |
| 4,268,275 A | 5/1981 | Chittick |
| 4,383,391 A | 5/1983 | Thomas et al. |
| 4,421,524 A | 12/1983 | Chittick |
| 4,487,958 A | 12/1984 | Ream et al. |
| 4,495,165 A | 1/1985 | Gurza |
| 4,497,637 A | 2/1985 | Purdy et al. |
| 4,501,644 A | 2/1985 | Thomas |
| 4,530,702 A | 7/1985 | Fetters et al. |
| 4,618,735 A | 10/1986 | Bridle et al. |
| 4,861,351 A | 8/1989 | Nicholas et al. |
| 4,992,480 A | 2/1991 | Mahajan et al. |
| 5,015,423 A | 5/1991 | Eguchi et al. |
| 5,032,618 A | 7/1991 | Marchionna et al. |
| 5,087,786 A | 2/1992 | Nubel et al. |
| 5,204,102 A | 4/1993 | Coles et al. |
| 5,221,290 A | 6/1993 | Dell |
| 5,462,908 A | 10/1995 | Liang et al. |
| 5,504,259 A | 4/1996 | Diebold et al. |
| 5,756,194 A | 5/1998 | Shogren et al. |
| 5,820,640 A | 10/1998 | Ikura et al. |
| 5,857,807 A | 1/1999 | Longo, Sr. |
| 5,863,467 A | 1/1999 | Mariner et al. |
| 6,133,328 A | 10/2000 | Lightner |
| 6,227,473 B1 | 5/2001 | Arnold |
| 6,228,806 B1 | 5/2001 | Mehta |
| 6,339,031 B1 | 1/2002 | Tan |
| 6,548,026 B1 | 4/2003 | Dales et al. |
| 6,747,067 B2 | 6/2004 | Melnichuk et al. |
| 6,811,703 B2 | 11/2004 | Elliott |
| 6,841,085 B2 | 1/2005 | Werpy et al. |
| 6,923,838 B2 | 8/2005 | Maubert et al. |
| 6,994,827 B2 | 2/2006 | Safir et al. |
| 7,033,972 B2 | 4/2006 | Shikada et al. |
| 7,226,566 B2 | 6/2007 | Beierle |
| 7,282,189 B2 | 10/2007 | Zauderer |
| 7,458,999 B2 | 12/2008 | Schenck et al. |
| 7,846,979 B2 | 12/2010 | Rojey et al. |
| 7,888,540 B2 | 2/2011 | Deluga et al. |
| 8,173,044 B1 | 5/2012 | Cheiky et al. |
| 8,197,573 B2 | 6/2012 | Scharf |
| 8,216,430 B2 | 7/2012 | Cheiky |
| 8,236,085 B1 | 8/2012 | Cheiky et al. |
| 8,293,958 B2 | 10/2012 | Cheiky |
| 8,317,891 B1 | 11/2012 | Cheiky et al. |
| 8,317,892 B1 | 11/2012 | Cheiky et al. |
| 8,318,997 B2 | 11/2012 | McAlister |
| 8,361,186 B1 | 1/2013 | Shearer et al. |
| 8,367,881 B2 | 2/2013 | Cheiky et al. |
| 8,430,937 B2 | 4/2013 | Cheiky et al. |
| 8,431,757 B2 | 4/2013 | Cheiky et al. |
| 8,568,493 B2 | 10/2013 | Cheiky et al. |
| 8,747,797 B2 | 6/2014 | Shearer et al. |
| 9,216,916 B2 * | 12/2015 | Traxler ................ C02F 1/283 |
| 9,478,324 B1 | 10/2016 | Favetta et al. |
| 9,493,379 B2 | 11/2016 | Cheiky et al. |
| 2002/0012725 A1 | 1/2002 | Carlson |
| 2003/0119952 A1 | 6/2003 | Werpy et al. |
| 2004/0111968 A1 | 6/2004 | Day et al. |
| 2004/0128909 A1 | 7/2004 | Smiley |
| 2006/0225345 A1 | 10/2006 | Westrate |
| 2007/0123420 A1 | 5/2007 | Hayashi et al. |
| 2008/0006519 A1 | 1/2008 | Badger |
| 2008/0016769 A1 | 1/2008 | Pearson |
| 2008/0093209 A1 | 4/2008 | Noto |
| 2008/0216391 A1 | 9/2008 | Cortright et al. |
| 2008/0223269 A1 | 9/2008 | Paoluccio |
| 2008/0300435 A1 | 12/2008 | Cortright et al. |
| 2008/0317657 A1 | 12/2008 | Hall et al. |
| 2008/0317907 A1 | 12/2008 | Thomas et al. |
| 2009/0007484 A1 | 1/2009 | Smith |
| 2009/0081292 A1 | 3/2009 | Otomo et al. |
| 2009/0126433 A1 | 5/2009 | Piskorz et al. |
| 2009/0139139 A1 | 6/2009 | Tilman et al. |
| 2009/0151251 A1 | 6/2009 | Manzer et al. |
| 2009/0183430 A1 | 7/2009 | Schubert et al. |
| 2009/0217575 A1 | 9/2009 | Raman et al. |
| 2009/0217584 A1 | 9/2009 | Raman et al. |
| 2009/0253947 A1 | 10/2009 | Brandvold et al. |
| 2009/0308787 A1 | 12/2009 | O'Connor et al. |
| 2010/0040510 A1 | 2/2010 | Randhava et al. |
| 2010/0162780 A1 | 7/2010 | Scharf |
| 2010/0179057 A1 | 7/2010 | Bool, III et al. |
| 2010/0180805 A1 | 7/2010 | Cheiky |
| 2010/0218417 A1 | 9/2010 | Bauldreay et al. |
| 2010/0223839 A1 | 9/2010 | Garcia-Perez et al. |
| 2010/0228062 A1 | 9/2010 | Babicki et al. |
| 2010/0236309 A1 | 9/2010 | Celia |
| 2010/0236987 A1 | 9/2010 | Kreis |
| 2010/0257775 A1 | 10/2010 | Cheiky |
| 2010/0270505 A1 | 10/2010 | Gallaspy et al. |
| 2010/0300866 A1 | 12/2010 | van Aardt et al. |
| 2010/0310447 A1 | 12/2010 | Yaniv et al. |
| 2010/0311157 A1 | 12/2010 | Van Alstyne et al. |
| 2011/0003693 A1 | 1/2011 | Spittle |
| 2011/0023566 A1 | 2/2011 | Lodwig et al. |
| 2011/0081336 A1 | 4/2011 | Medoff |
| 2011/0092726 A1 | 4/2011 | Clarke |
| 2011/0100359 A1 | 5/2011 | North |
| 2011/0172092 A1 | 7/2011 | Lee et al. |
| 2011/0177466 A1 | 7/2011 | Cheiky |
| 2011/0209386 A1 | 9/2011 | Cheiky et al. |
| 2011/0212004 A1 | 9/2011 | Cheiky et al. |
| 2011/0258912 A1 | 10/2011 | O'connor et al. |
| 2012/0103040 A1 | 5/2012 | Wolf et al. |
| 2012/0125064 A1 | 5/2012 | Joseph et al. |
| 2012/0220454 A1 | 8/2012 | Chen et al. |
| 2012/0237994 A1 | 9/2012 | Das et al. |
| 2012/0283493 A1 | 11/2012 | Olson et al. |
| 2012/0286209 A1 | 11/2012 | Cheiky et al. |
| 2012/0304718 A1 | 12/2012 | Cheiky et al. |
| 2012/0304719 A1 | 12/2012 | Cheiky et al. |
| 2012/0322130 A1 * | 12/2012 | Garcia-Perez .......... C02F 11/04 435/167 |
| 2013/0025188 A1 | 1/2013 | Cheiky et al. |
| 2013/0025190 A1 | 1/2013 | Cheiky et al. |
| 2013/0123103 A1 | 5/2013 | Anderson et al. |
| 2013/0213101 A1 | 8/2013 | Shearer et al. |
| 2014/0024528 A1 | 1/2014 | Smith et al. |
| 2014/0037536 A1 | 2/2014 | Reimerink-Schats et al. |
| 2014/0161709 A1 | 6/2014 | Karthikeyan |
| 2014/0177136 A1 | 6/2014 | Kim et al. |
| 2014/0345341 A1 | 11/2014 | Fiato et al. |
| 2014/0345343 A1 | 11/2014 | Wilson et al. |
| 2014/0349847 A1 | 11/2014 | Schrader |
| 2014/0352378 A1 | 12/2014 | Shearer et al. |

(56) References Cited

U.S. PATENT DOCUMENTS

| | | | |
|---|---|---|---|
| 2015/0101372 A1 | 4/2015 | Cheiky et al. | |
| 2015/0128672 A1 | 5/2015 | Shearer et al. | |
| 2015/0136581 A1* | 5/2015 | Aupperle | C10L 5/442 202/93 |
| 2015/0140585 A1* | 5/2015 | Silberg | C12Q 1/48 435/15 |
| 2015/0157661 A1 | 6/2015 | Eddy et al. | |
| 2015/0361369 A1 | 12/2015 | Tait et al. | |
| 2016/0023959 A1 | 1/2016 | Bontchev et al. | |
| 2016/0102024 A1 | 4/2016 | Schrader et al. | |
| 2016/0199811 A1* | 7/2016 | McLaughlin | C01B 31/10 423/415.1 |
| 2016/0362607 A1 | 12/2016 | Weaver et al. | |
| 2016/0368831 A1 | 12/2016 | Bontchev et al. | |

FOREIGN PATENT DOCUMENTS

| | | |
|---|---|---|
| CN | 103053244 B | 12/2014 |
| EP | 0140811 A2 | 5/1985 |
| KR | 100819505 | 4/2008 |
| WO | WO-82/04223 A1 | 12/1982 |
| WO | WO-2004037747 A2 | 5/2004 |
| WO | WO-2009004652 A1 | 1/2009 |
| WO | WO-2010084230 A1 | 7/2010 |
| WO | WO-2010129988 A1 | 11/2010 |
| WO | WO-2011006717 A2 | 1/2011 |
| WO | WO-2011014916 A1 | 2/2011 |
| WO | WO-2011097183 A2 | 8/2011 |
| WO | WO-2011143380 A2 | 11/2011 |
| WO | WO-2011143718 A1 | 11/2011 |
| WO | WO-2014091279 A1 | 6/2014 |
| WO | WO-2014146205 A1 | 9/2014 |
| WO | WO-2016054431 A1 | 4/2016 |
| WO | WO-2016187161 A1 | 11/2016 |

OTHER PUBLICATIONS

Beesley, et al., "A review of Biochars' Potential Role in the Remediation, Revegetation and Restoration of Contaminated Soils," Environmental Pollution 159, pp. 3269-3282 (Jul. 23, 2011).
Berek, et al., "Improving Soil Productivity with Biochars," ICGAI, Yogyakarta, Indonesia, 23 pgs. (Nov. 11-14, 2013).
Bucheli, et al., "Polycyclic Aromatic Hydrocarbons and Polychlorinated Aromatic Compounds in Biochar," Biochar for Environmental Management, Ch. 21, pp. 593-622 (Jan. 2015).
Buerschaper, R., "Thermal and Electrical Conductivity of Graphite & Carbon at Low Temperatures," Jour. of App. Physics, pp. 452-454 (1944).
Cheng, et al., "Stability of Black Carbon in Soils Across a Climatic Gradient," Journal of Geophysical Research, vol. 113, G02027, pp. 1-10 (2008).
Chew, T.L. and Bhatia, S., "Catalytic Processes Towards the Production of Biofuels in a Palm Oil and Oil Palm Biomass-Based Biorefinery," Bioresource Tech., vol. 99, pp. 7911-7922 (2008).
Demirbas, A., "Effects of Temperature and Particle Size on Bio-Char Yield from Pyrolysis of Agricultural Residues," J. Anal. Appl. Pyrolysis, vol. 72, pp. 243-248 (2004).
Downie, "Biochar Production and Use: Environmental Risks and Rewards", PhD Thesis, The University of New South Wales; Sydney, Australia, p. 1-16, p. 155-168 (2011) (23 pages).
Elliott, D.C. and Neuenschwander, G.G., "Liquid Fuels by Low-Severity Hydrotreating of Biocrude," Dev. in Thermochemical Biomass Conversion, vol. 1, pp. 611-621 (1996).
Extended European Search Report issued by the European Patent Office for European Patent Application No. 12797129.9 dated Mar. 6, 2015 (7 pgs.).
Extended European Search Report issued by the European Patent Office for European Patent Application No. 12817137.8 dated Jul. 13, 2015 (8 pgs.).

Faludi, J., "A Carbon-Negative Fuel", from World Changing: Change Your Thinking, Oct. 16, 2007; www.worldchanging.com/archives/007427.html, accessed Apr. 29, 2015 (6 pgs.).
Forssell, "Chapter 16: Potential Use of Carbohydrates as Stabilizers and Delivery Vehicles of Bioactive Substance in Foods", in *Functional Food Carbohydrates*, (Biliaderis, et al., EDs), CRC Press 2006, pp. 511-525 (18 pages).
Gehrer, and Hayek, K., "A Fully Programmable System for the Study of Catalytic Gas Reactions," J. Phys. E: Sci. Instrum., vol. 18, pp. 836-838 (1985).
Gray, et al., "Water Uptake in Biochars: The Roles of Porosity and Hydrophobicity;" Biomass and Bioenergy, vol. 61, No. 1, pp. 196-205 (Jan. 23, 2014).
Greenfacts: Facts on Health and the Environment, "Scientific Facts on Dioxins", Apr. 13, 2017, 3 pp.; retrieved from https://www.greenfacts.org/en/dioxins/ on Aug. 15, 2004.
Hadjittofi, et al., "Activated Biochar Derived from Cactus Fibres—Preparation, Characterization and Application on Cu(II) Removal from Aqueous Solutions," Bioresource Technology, vol. 159, pp. 460-464 (May 2014).
Hua, et al., "Impacts Upon Soil Quality and Plant Growth of Bamboo Charcoal Addition to Composted Sludge," Environmental Technology, vol. 33, No. 1, pp. 61-68 (Jan. 18, 2012).
Innovation Fluides Supercritiques, "Explore, Use, Make the Most of Supercritical Fluids," Nov. 27, 2015. Online, retrieved from the Internet on Mar. 7, 2017; <http://web/archive.org/web/20151127045828/http://www.supercriticalfluid.org/supercritical-fluids.146.0>html; 2 pp.
Jindo, et al., "Biochar Influences the Microbial Community Structure During Manure Composting with Agricultural Wastes," Science of the Total Environment, vol. 416, pp. 476-481 (Jan. 5, 2012).
Karmakar, et al., "Plant Defence Activators Inducing Systemic Resistance in *Zingiber officinale* Rosc. Against *Pythium Aphanidermatum* (Edson) Fitz.," Indian Journal of Biotechnology, vol. 2, pp. 591-595 (2003).
Kim, et al., "Characteristics of Crosslinked Potato Starch and Starch-Filled Linear Low-Density Polyethylene Films," Carbohydrate Polymers, vol. 50, pp. 331-337 (2002).
Kolton, et al., "Impact of Biochar Application to Soil on the Root-Associated Bacterial Community Structure of Fully Developed Greenhouse Pepper Plants," Appl. And Env. Microbiology, vol. 77, No. 14, pp. 4924-4930, (Jul. 2011).
Laird, D., "The Charcoal Vision: A Win Win Win Scenario for Simultaneously Producing Bioenergy, Permanently Sequestering Carbon, while Improving Soil and Water Quality", Agron, J., vol. 100, No. 1, pp. 178-181, Abstract Only (2008) (4 pages).
Lashari, et al., "Effects of Amendment of Biochar-Manure Compost in Conjunction with Pyroligneous Solution on Soil Quality and Wheat Yield of a Salt-Stressed Cropland from Central China Great Plain," Field Crops Research, vol. 144, pp. 113-118 (Mar. 20, 2013).
Lehmann, J., et al., "Nutrient Availability and Leaching in an Archaeological Anthrosol and a Ferralsol of the Central Amazon Basin: Fertilizer, Manure and Charcoal Amendments," Plant and Soil, vol. 249, pp. 343-357 (2003).
Lima, et al., "Physicochemical and Adsorptive Properties of Fast-Pyrolysis Bio-Chars and their Steam Activated Counterparts," J. Chem. Tech. Biotechnol., vol. 85, pp. 1515-1521 (2010).
Liu, et al., "An Experimental Study of Rheological Properties and Stability Characteristics of Biochar-Glycerol-Water Slurry Fuels," Fuel Processing Technology, vol. 153, Issue 1, pp. 37-42 (Aug. 5, 2016).
Mathews, J.A., "Carbon-Negative Biofuels", Energy Policy, vol. 36, pp. 940-945 (2008).
McHenry, Mark P., "Agricultural Bio-Char Production, Renewable Energy Generation and Farm Carbon Sequestration in Western Australia: Certainty, Uncertainty and Risk," Agriculture, Ecosystems and Environments, vol. 129, pp. 1-7 (2009).
Mohan, et al., "Pyrolysis of Wood/Biomass for Bio-Oil: A Critical Review," Energy & Fuels, vol. 20, pp. 848-889 (2006).
Norman, et al.; "Best Management Practices for Reclaiming Surface Mines in Washington and Oregon," Oregon Department of Geology and Mineral Industries, Open-File Report O-96-2, revised ed. Dec. 1997; www.oregongeology.org, (128 pgs.).

(56) References Cited

OTHER PUBLICATIONS

Ogawa, et al., "Carbon Sequestration by Carbonization of Biomass and Forestation; Three Case Studies," Mitigation and Adaption Strategies for Global Change, vol. 11, pp. 429-444 (2006).

Oh, et al., "Utilization of Biochar Impregnated with Anaerobically Digested Slurry as Slow-Release Fertilizer," Journal of Plant Nutrition and Soil Science, vol. 177, Issue 1, pp. 97-103 (2014).

Omata, et al., "Optimization of Cu Oxide Catalyst for Methanol Synthesis under High $CO_2$ Partial Pressure Using Combinatorial Tools," App. Catalysis A: General, vol. 262, pp. 207-214 (2004).

Preston, C. M. and Schmidt, M. W. I., "Black (Pyrogenic) Carbon: a Synthesis of Current Knowledge and Uncertainties with Special Consideration of Boreal Regions," Biogeosciences, vol. 3, pp. 397-420 (2006).

Rosenberg, et al., "More on Commercial Carbon Resistors as Low Pressure Gauges," Intl. Jour of Impact Eng., vol. 34, pp. 732-742 (2007).

Schmidt, et al., "Biochar and Biochar-Compost as Soil Amendments to a Vineyard Soil: Influences on Plant Growth, Nutrient Uptake, Plant Health and Grape Quality," Agriculture, Ecosystems and Environment, vol. 191, Issue 15, pp. 117-123 (2014).

Sharma, R. K. and Bakhshi, N. N., "Catalytic Upgrading of Pyrolysis Oil," Energy & Fuels, vol. 7, No. 2, pp. 306-314 (1993).

Shivaram, et al., "Flow and Yield Stress Behaviour of Ultrafine Mallee Biochar Slurry Fuels: The Effect of Particle Size Distribution and Additives," Fuel, vol. 104, pp. 326-332 (2013).

Sorrenti, G. (Doctoral Thesis): "Biochar in Perennial Crops: Nutritional, Agronomical and Environmental Implications," University of Bologna, Abstract, Chs. 4, 5, 7, p. 101 Table 4.2 (Mar. 1, 2015) (115 pages).

Takeishi, K., "Dimethyl Ether & Catalyst Development for Production of Syngas," Biofuels, vol. 1(1), pp. 217-226 (2010).

Tryon, E.H.; "Effect of Charcoal on Certain Physical, Chemical, and Biological Properties of Forest Soils," Ecological Monographs, vol. 18, No. 1, pp. 81-115 (Jan. 1948) (36 pages).

Wikipedia; *Bacillus Thuringiensis*; Dec. 27, 2015; online, retrieved from the Internet on Mar. 6, 2017; <https://en.wikipedia.org/w/index.php?title=Bacillus+thuringiensis&oldid=696970111>; 6 pages.

Xusheng, et al., "Implications of Production and Agricultural Utilization of Biochar and its International Dynamic," Transactions of the CSAE, vol. 27, No. 2, 7 pgs. (2011) with English Abstract (7 pages).

\* cited by examiner

SYSTEM AND METHOD FOR PURIFYING PROCESS WATER

This application is a continuation of U.S. application Ser. No. 14/063,350, filed Oct. 25, 2013, now U.S. Pat. No. 9,216,916, the contents of which are incorporated herein by reference in their entirety.

FIELD OF THE INVENTION

The present application relates to a method for treating an effluent of process water derived from biomass pyrolysis.

BACKGROUND OF THE INVENTION

The world is running out of inexpensive fossil fuels. To maintain present standards of living, it is imperative to find suitable substitutes for these fossil fuels. The conversion of biomass to liquid fuels, especially transportation fuels, is an attractive path towards the partial replacement of fossil fuels. The production of biofuels entails the conversion of an oxygen-rich source (biomass) to an oxygen-deficient source (liquid fuels). The oxygen is removed as water or carbon dioxide. Depending on the specifics of the conversion process, the water removed (termed process water) is contaminated with various inorganic and organic compounds. The discharge of this process water is regulated by local, state and federal laws.

The treatment of process water prior to discharge may entail considerable capital and operational costs. It is desirable to minimize these costs and to apply minimal treatments to the process water. Ideally, the conversion process itself should produce little contamination of the process water. In cases where the production of process water is unavoidable, this water should be ideally treated within the confines of the process so that the process water exits out ready to be discharged or used in another process. The US Environmental Protection Agency recommended process for the reduction of benzene, dichlorobenzene, toluene, xylene and other aromatic hydrocarbons in water includes passing process water through granular carbon and subjecting the resulting effluent to packed tower aeration in a column via an external air supply. The air and the effluent flow countercurrently through a high surface area packed tower to produce clean water. The process is capable of reducing the concentration of various organic contaminants in water to parts-per-billion (ppb) levels, however, it requires a separate process dedicated solely to waste water processing.

Accordingly, there is a need for a process water treatment for a biomass pyrolysis process which recycles a biochar product stream and requires minimal investment capital and operating costs.

SUMMARY OF THE INVENTION

The present application describes a method and a system for removing contaminants from process water generated from biomass conversion to transportation fuels. In accordance with certain embodiments, the process is a biochar recycling process. In accordance with one embodiment, the described process involves the removal of light organic contaminants, such as methane, ethane, methanol and ethanol from the process water stream. In accordance with another embodiment, the described process involves the removal of heavier organic contaminants, such as substituted and branched aromatic compounds, polyaromatic compounds, and iso-branched hydrocarbons. In yet another embodiment, a process is described wherein inorganic impurities are removed from the process water stream.

In accordance with one embodiment, a method is provided for removing contaminants, such as organic and inorganic contaminants, from process water produced during the biomass conversion to fuels. In accordance with one aspect, the method involves pyrolyzing biomass to produce gaseous compounds and biochar; converting the gaseous compounds to fuels and producing process water; passing the process water through a biochar-containing adsorptive medium; and removing gaseous organic compounds from the process water to produce treated process water. In some embodiments, the process water from the pyrolysis process and the conversion process is treated through a two-step process involving passing the water through a biochar-containing adsorptive medium and heating the water to remove gaseous organic compounds.

In accordance with another aspect, a biochar recycling system for treatment of water produced from biomass conversion to fuels is provided. The system includes a pyrolyzer capable of pyrolyzing biomass to produce gaseous compounds (biovapors) and biochar, a gasification system that uses biochar generated from the pyrolysis process to create synthesis gas and a highly adsorptive carbon, a synthesis gas clean up system, a fuel production system that converts biovapors from the pyrolysis process to fuel and process water, and a process water treatment method that takes in the process water from the fuel production and outputs dischargeable water. In some embodiments the water treatment system removes inorganic and organic impurities from the process waste. Other embodiments call for gasifying the removed impurities.

In certain embodiments, the pyrolysis process is considered to be a mild pyrolysis process entailing the stepwise decomposition of biomass constituents. For example, pressure shocks and temperature ramps can be applied to the biomass in a process that utilizes the enhanced thermal conductivity of partially carbonized biomass. Examples of a suitable mild pyrolysis process are described in co-owned U.S. Pat. Nos. 8,293,958 and 8,367,881, the contents of each of which is hereby incorporated in its entirety.

In accordance with one aspect, the removed species from the process water are disposed within the biomass conversion system. In another embodiment, the removed organic impurities are decomposed to synthetic gas (syngas) in a gasification system. In yet another embodiment, the remnant inorganic minerals in the biomass appear in the biochar and could potentially be reused for agricultural purposes to accelerate biomass growth.

The contaminant removal may be achieved via the use of a porous carbonaceous adsorbent in combination with an apparatus to heat the process water. In accordance with a particular embodiment, the carbonaceous adsorbent is created by a pyrolysis process which applies simultaneous pressure shocks and temperature ramps to the biomass. The carbonaceous adsorbent may be subjected to additional processes which increase the porosity of the adsorbent. In another embodiment, heat directed from another part of the biomass conversion process can be used to remove gaseous organic impurities from the water.

BRIEF DESCRIPTION OF THE DRAWINGS

The subject matter is described with reference to the following figures, which are presented for the purpose of illustration only and are not intended to be limiting of the invention.

DETAILED DESCRIPTION OF INVENTION

In accordance with one aspect, the present application involves a water purification system for a biomass conversion process to transportation fuels that entails little capital expenditure and makes efficient use of equipment and materials. In some embodiments, the system provides a purification system that utilizes energy (e.g., in the form of heat and fuel) and materials (e.g., gases, vapors and char) generated within the conversion system to produce fuel and biochar. The system and method treats wastewater produced within a biomass conversion system and renders it suitable for discharge or other purposes, such as for agricultural use, while capturing and recycling useful components entrained within the waste process water.

Figure 1:
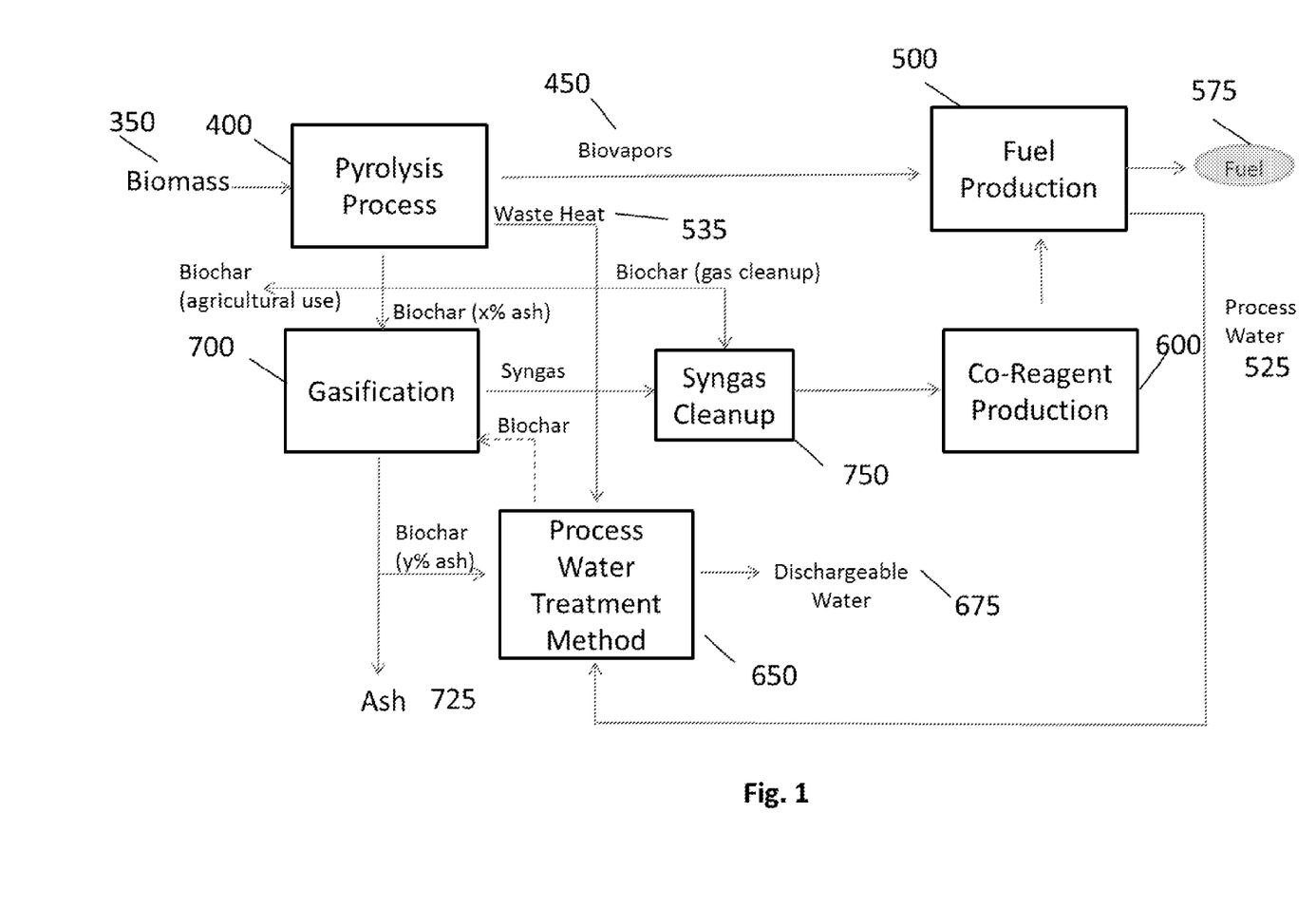
FIG. 1 is a diagram of an embodiment showing various interactions of components in the present system for purifying process water.

FIG. 1 illustrates a flow diagram of the basic components for a particular embodiment of the water treatment method and system. In the illustrated system, incoming biomass 350 is subjected to a pyrolysis process 400 to produce gaseous components 450 (also called biovapors), biochar and waste heat 535. The biochar from the pyrolysis process (containing x % ash) can be directed to a gasifier, a process involving carbon sequestration, or a process entailing synthesis gas cleanup. The gaseous compounds 450 are subjected to a catalytic conversion process 500 which thermo-chemically transforms the gaseous compounds into fuel 575, e.g., hydrocarbons, and process water 525. Process water 525 is directed to the internal water treatment method 650 which purifies the incoming process water and releases clean water 675. The internal water treatment process utilizes biochar generated in a gasification process 700. Organic impurities can be adsorbed on the biochar used in the water treatment method and other impurities (of the lighter type such as CO, C1-C5 compounds, etc.) can be re-directed to gasification system 700 via reintroduction of biochar from the process water treatment method 650. The gasification system 700 concentrates the ash and minerals in the incoming biochar (to y %) from the pyrolysis process, as well as decomposes the organics within the biochar adsorbed from internal water treatment process. Ash product 725 is rejected to the outside. Syngas produced from the gasification can be directed to the synthesis gas cleanup process 750 to be used in co-reagent production process 600. The gas clean-up process uses biochar from pyrolysis process 400. Co-reagent produced from process 600 can be utilized in fuel production process 500 along with biovapors 450 to produce fuel 575 and process water 525.

Biomass, as used herein, includes any material derived or readily obtained from plant sources. Such material can include without limitation: (i) plant products such as bark, leaves, tree branches, tree stumps, hardwood chips, softwood chips, grape pumice, sugarcane bagasse, switchgrass; and (ii) pellet material such as grass, wood and hay pellets, crop products such as corn, wheat and kenaf. This term may also include seeds such as vegetable seeds, fruit seeds, and legume seeds.

The term 'biomass' can also include: (i) waste products including animal manure such as poultry derived waste; (ii) commercial or recycled material including plastic, paper, paper pulp, cardboard, sawdust, timber residue, wood shavings and cloth; (iii) municipal waste including sewage waste; (iv) agricultural waste such as coconut shells, pecan shells, almond shells, coffee grounds; and (v) agricultural feed products such as rice straw, wheat straw, rice hulls, corn stover, corn straw, and corn cobs.

In accordance with one aspect, the biomass may be processed by a variety of techniques into a particle size suitable for dispensing into a reaction chamber. In certain embodiments, the biomass may be reduced in size to particle sizes ranging from about 0.001 inch to 1 inch in diameter, limited by processing equipment size and thermal transfer rates. In accordance with other embodiments, the biomass may be used with little or no reduction in size. Particle size may be achieved using equipment such as chippers, grinders or hog mills, as is well known by those of skill in the art. The biomass can be preprocessed into pellets, briquettes or other shapes as desired. Biomass may be introduced in raw form or dry form.

The pyrolysis process 400 may comprise any of a number of well-known pyrolysis reactors, including fixed bed reactors, fluidized bed reactors, circulating bed reactors, bubbling fluid bed reactors, vacuum moving bed reactors, entrained flow reactors, cyclonic or vortex reactors, rotating cone reactors, auger reactors, ablative reactors, microwave or plasma assisted pyrolysis reactors, and vacuum moving bed reactors that are capable of thermal decomposition of biomass to produce gaseous and vaporous products and a solid residue richer in carbon content, char. It may also comprise a chamber in a biomass fractionating system as described in co-owned U.S. Patent Publication No. 2010/0180805, now U.S. Pat. No. 8,216,430, the content of which is incorporated herein by reference in its entirety. In one aspect, the pyrolysis process is selected to provide conditions that allow the collection of useful chemical compounds known as bio-intermediary compounds as well as the production of char.

The basic principles behind a particularly useful bio-char generation process are disclosed in commonly assigned U.S. Pat. No. 8,367,881, entitled "Method for Biomass Fractioning by Enhancing Thermal Conductivity," the contents of which are hereby incorporated by reference. Additional aspects of suitable bio-char generation processes are described in commonly assigned U.S. Pat. No. 8,293,958 and U.S. patent application Ser. No. 13/189,709, published as U.S. Pat. App. Pub. No. 2013/0025190. The contents of these patent publications are also incorporated herein by reference. In accordance with a particular embodiment, biomass may optionally be pretreated and loaded piecemeal onto a plurality of movable biomass reaction chambers, movable by common drive mechanisms, such as gear drives, chain drives, ratcheting sprockets, etc. The reaction chambers may be arranged on a disc that can rotate continuously or in a stepwise fashion. The pretreatment may comprise a drying step or other steps.

In certain cases, the biomass may be dispensed into thin sheets whose total thickness is about 1 to 30 times the biomass particle size. A particularly useful thickness for the chamber for uncompressed biomass (which is ground or chopped to ⅛" or smaller) is approximately ¾" in thickness. As the biomass is heated and further pulverized (as discussed below), the emerging char quickly condenses to a layer about 1/10" thick. This aspect ratio ensures mild pyrolyzing conditions that allow the collection of useful chemical compounds known as bio-intermediary compounds as well as the production of char. A person of skill in the art will appreciate that these biomass chambers can be sized in width and length along with the diameter of their corresponding drive disc to any such size as appropriate for the desired throughput for the biomass fractionator, without departing from the scope of the invention.

The reduced-size biomass may be subjected first to a heating profile, typically a linear temperature ramp, which is typically designed to dewater the biomass. Subsequent heating profiles may end at progressively higher temperatures and have the purpose of outgassing and thermochemically converting biomass into useful bio-compounds with progressively higher devolatilization temperatures. In order to accomplish this devolatilization in a selective manner, the temperature treatment may be accompanied by a pressure treatment. In accordance with some aspects, a compacting station (e.g., comprising a series of anvils) can be used to subject the biomass to accompanying pressure profiles, which comprise a sequence of pressure shocks that exploit the inherent compressional features of carbon. The pressure shocks assure fractioning of cellulose walls and compress nascent partially carbonized particles within the biomass. This compression brings these carbon particles within a close enough contact to increase the electrical and thermal conductivity of particles. The pressure shocks may be administered by any media that impacts the biomass with sufficient force to fracture the biomass, such as metallic anvils, hydraulic rams, or other suitable media.

In some embodiments, the temperature profiles are linear ramps ranging from about 0.001° C./sec to 1000° C./sec, more particularly from about 1° C./sec to 100° C./sec, and still more particularly from about 10° C./sec to 30° C./sec. By way of example, a processing heating station may be heated by electrical heating elements, direct flame combustion, or by directed jets of heated working gas or supercritical fluid. The heating profile and the pressure compaction profile may be linked via a feedback loop and/or may be applied by the same agent simultaneously. In the latter case, sequential compaction via a heated element at one temperature necessarily leads to different temperature profiles, as the biomass material changes from non-carbonized to fully carbonized state. The compacting station may be controlled by electrically driven devices, air compressed devices, or any other form of energy that serves to impact load the biomass. In accordance with other embodiments, the temperature and/or pressure may be held relatively constant during the pyrolysis process.

The physical characteristics of the biochar will differ depending on the starting biomass material, which can include any of the above-identified materials such as wood, grasses, etc. Different biomass feedstocks are expected to produce different types of biochars, varying in porosity and other physical characteristics. The biomass feedstocks can be fed individually or as mixtures of different feedstocks to produce biochars containing different physical characteristics.

Unlike pyrolysis processes which produce bio-oil, as for example in a process that pyrolyzes biomass in a fluidized bed and simultaneously produces gaseous components and biochar, certain embodiments of the pyrolysis process 400 are capable of producing gaseous compounds and biochar in separate and substantially uncontaminated forms. As used herein, the term "substantially uncontaminated" indicates that any contamination in the composition is less than 20%, more particularly less than 10%, still more particularly less than 5% and in certain cases less than 1% by weight. This is an advantage in obviating the need to frequently regenerate catalysts that are used in the conversion of the gaseous components to fuel. Furthermore, this separation allows the biochar to be used as a purifying agent in the water treatment process.

The gaseous components may comprise any one of thermo-chemical products of biomass decomposition from the pyrolysis process. The basic structural units of biomass can include compounds chosen from the broad groups comprising hemicellulose, cellulose, and lignins. The controlled decomposition of these structural units in the biomass pyrolysis process leads to a wide range of gaseous compounds. Products of hemicellulose pyrolysis include gaseous comprising, but not limited to, ketones, acids, aldehydes, alcohols, furans and other oxygenates. Products from lignin pyrolysis include, but are not limited to, guaiacols, syringols, and phenols. Cellulose pyrolysis yields primarily synthesis gas.

The process water 525 produced from the pyrolysis process may include a mixture of water initially present in the biomass and water generated from biomass decomposition products. The resulting process water may contain a number of compounds resulting from the dehydration, dehydrogenation, deoxygenation and decarboxylation of cellulose-based material in the biomass. The compounds may include acetic acid, acetaldehyde, acetates, substituted acetates, light hydrocarbons such as methane, ethane, propane and butane and a number of other water soluble and water insoluble compounds.

Process water 525 originates directly from the catalytic conversion of gaseous components 450 to fuel 575 or from the conversion of co-reagent to fuel 575. The gaseous components generated from the pyrolysis process typically include oxygenated organic compounds, due to the biomass source. Thus, the catalytic conversion of the gaseous components converts these compounds into hydrocarbon products with increasingly higher carbon content and reduced oxygen content. The typical reaction by-products to this conversion include water (a sink for the excluded oxygen). This process water can be collected directly after the catalytic conversion or subsequent to a separation process, which separates hydrocarbons from process water.

The catalytic conversion process includes a series of catalysts selected to assist in the conversion of the pyrolysis biovapors into fuel components. The series of catalysts can include, for example, a dehydration catalyst that forms olefinic hydrocarbons from the gaseous components, an aromatization catalyst that enriches the stream in aromatic compounds and a gas-upgrading catalyst, oligomerization catalysts that form higher weight hydrocarbons, and hydrotreating catalysts that form aliphatic hydrocarbons. The output from each catalytic station when cooled is comprised of gaseous gases (at the cooling temperature), renewable fuel and water. In the collection of water from each of these processes, gas and vapor products as well as char become entrained in the process water. For example, a syngas catalytic conversion is exemplified by the following reaction leading to the formation of dimethyl ether:

$$4H_2 + 2CO \rightarrow CH_3OCH_3 + H_2O$$

The process water from this conversion, for example, would be expected to contain methanol as a contaminant. If the dimethyl ether was subsequently reacted to produce longer hydrocarbons, for example by being subjected to an aromatization catalyst, the process water is expected to contain a variety of aromatic components in the water as contaminants.

In one aspect, the method treats wastewater produced within the biomass conversion system using biochar generated within the biomass conversion system. The biochar can be used as an agent to remove impurities from synthesis gas and as an adsorbent of inorganic and organic impurities, acting as an activated carbon filter to trap the impurities within its pores. The biochar from pyrolysis process 400 may have a surface area varying from 0.1 $m^2/g$ to 500 $m^2/g$ depending on the original composition of the biomass and the specific parameters of the pyrolysis. In some embodiments the pyrolysis may comprise certain combinations of pressure shocks and temperatures which may lead to increased surface area in the biochar as steam rushes out of the fracturing biomass cell walls. The biochar from the pyrolysis process directed to a gasifier undergoes an activation step (through gasification process 700) which increases the surface area of the biochar by creating pores, e.g., increasing surface area, within the biochar through reaction of the carbon with external reactants or further decomposition of adsorbed volatile matter. Typical external reactants include steam, oxygen, and carbon dioxide. The gasification process 700 is typically performed at temperatures between about 700° C. and 1200° C., and more generally between about 800° C. and 1100° C. Some reactants may be obtained from within the pyrolysis system itself. In accordance with certain embodiments, the biochar produced by the pyrolysis or fractioning process is generally free of tar. In particularly useful embodiments, the biochar that is gasified has a surface area greater than 500 $m^2/g$.

Figure 2:
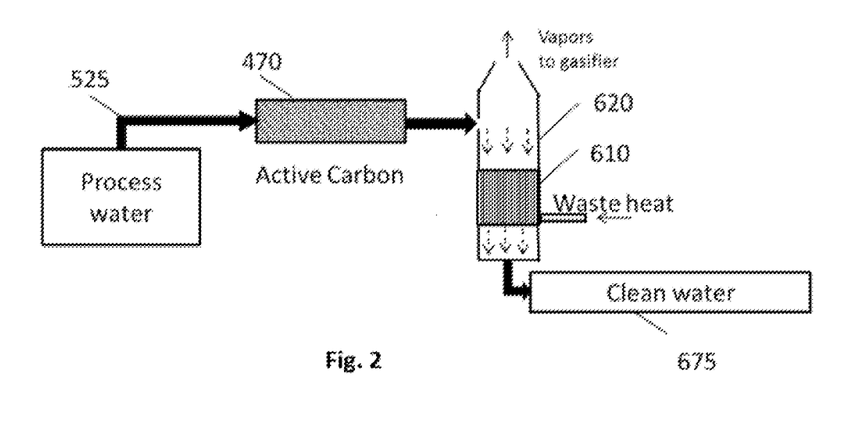
FIG. 2 is an embodiment showing some elements of the present invention for purification of process water.

The biochar resulting from the gasification step can then be used as an adsorbent of inorganic and organic impurities, acting as an activated carbon filter to trap the impurities within its pores. In particular, the adsorbent is effective at trapping heavy hydrocarbon molecules, which cannot easily be removed by distillation. The biochar from the pyrolysis process can be physically transferred out of the pyrolyzer to be used in the syngas clean up step or it may transferred to the gasifier. An embodiment of a flow diagram illustrating the water treatment approach according to one or more embodiments of the present invention is shown in FIG. 2. Process water flow stream 525 is sent to chamber 470 housing biochar created in gasification process 700 to remove inorganic, particulate and organic impurities and then subsequently sent to a heater apparatus 620 which removes lighter impurities. Waste heat from other processes in the system (such as catalytic conversion process 500 or gasifier 700) may be used to provide at least some of the heat supplied to the heater apparatus 620. Heater apparatus 620 may include a packed column 610 to facilitate removal of lighter impurities. This packed column typically uses a high surface area solid material designed to increase the interfacial contact between a liquid and a gas. The column may be packed with material such as Raschig rings, structured packing material, steel wool, or similar material practiced by those skilled in the art. In another embodiment, the process water streams can be diverted to the heater apparatus first and the outgoing process water can then be passed through the biochar adsorbent.

As shown in FIG. 2, the water treatment process may also include a step for boiling off organic contaminants not easily removed by the biochar adsorbent. These organic contaminants in the process water may include, but are not limited to, light, non-condensable or remnant gases such as methane, ethane, propane, butane, pentane, hexane, benzene, methanol, ethanol, and propanol. A light boiling, with or without the assistance of an entrained air flow, will serve to remove these gases. The energy for this process may be derived from waste heat from the catalytic columns in the catalytic conversion process 500. Catalytic reactions are often exothermic and sometimes strongly exothermic. This energy can be directed in the form of heat to the process water treatment method. Typically, the catalytic columns may be heated to between 200° C. and 500° C., and this waste heat may be directed to the process water. Prior to entering apparatus 620, the hot air from a catalytic column may be directed to a heat exchanger (not shown) and optionally to a chiller to bring down the temperature of the hot air to a range that will bring the process water to a light boil. Hot air may also be directed from the gasifier. The expelled vapors from the boiling may be sent to the gasifier. In accordance with another embodiment, packed aeration may be used instead of boiling. Either method in combination with biochar adsorption is suitable for bringing the contaminant levels in the process water to below 1% hydrocarbons, in particular below 1% aromatic hydrocarbons. Some embodiments will bring contaminant levels below 100 ppm, and other embodiments will bring contaminant levels below 1 ppm while still other embodiments will reduce contaminant levels below 10 ppb. After processing, the water is typically clean enough to be discharged without further processing.

The biochar from the pyrolysis step can enter with a specified mineral concentration that reflects the mineral content in the initial biomass. After pyrolysis, the produced biochar contains ash levels at a level x % by weight, as shown in FIG. 1. This percentage can vary typically from about 1% for woody biomass to about 12% for straw and bagasse. To decompose the organic contaminants adsorbed within the pores of the biochar used in the process water treatment, the biochar may be redirected to gasification process 700.

The gasification is typically performed at temperatures exceeding 700° C. in the presence of various reactants such as steam, oxygen, or carbon dioxide. Numerous embodiments exist for performing this gasification. Examples of suitable gasifiers include, but are not limited to, up-draft gasifiers, down-draft gasifiers, fluidized bed reactors, plasma reactors, and entrained flow gasifiers. The gasification step will selectively react carbon and concentrate the remaining ash to y % Typically, y is greater than x and the range of y can be from about 1% to 50%. In the presence of oxygen, for example, the organic contaminants along with the carbon decompose to yield syngas as product. The syngas can be directed to the catalytic columns in process 500 and converted into fuel. The biochar exiting from the pyrolyzer can be used as a soil fertilizer to accelerate plant growth. The particular steps that can be used to render biochar suitable as a soil amendment have been disclosed in commonly assigned U.S. patent application Ser. No. 13/189,709 titled "Method for Enhancing Soil Growth using Bio-char," the contents of which are hereby incorporated by reference.

Figure 3:
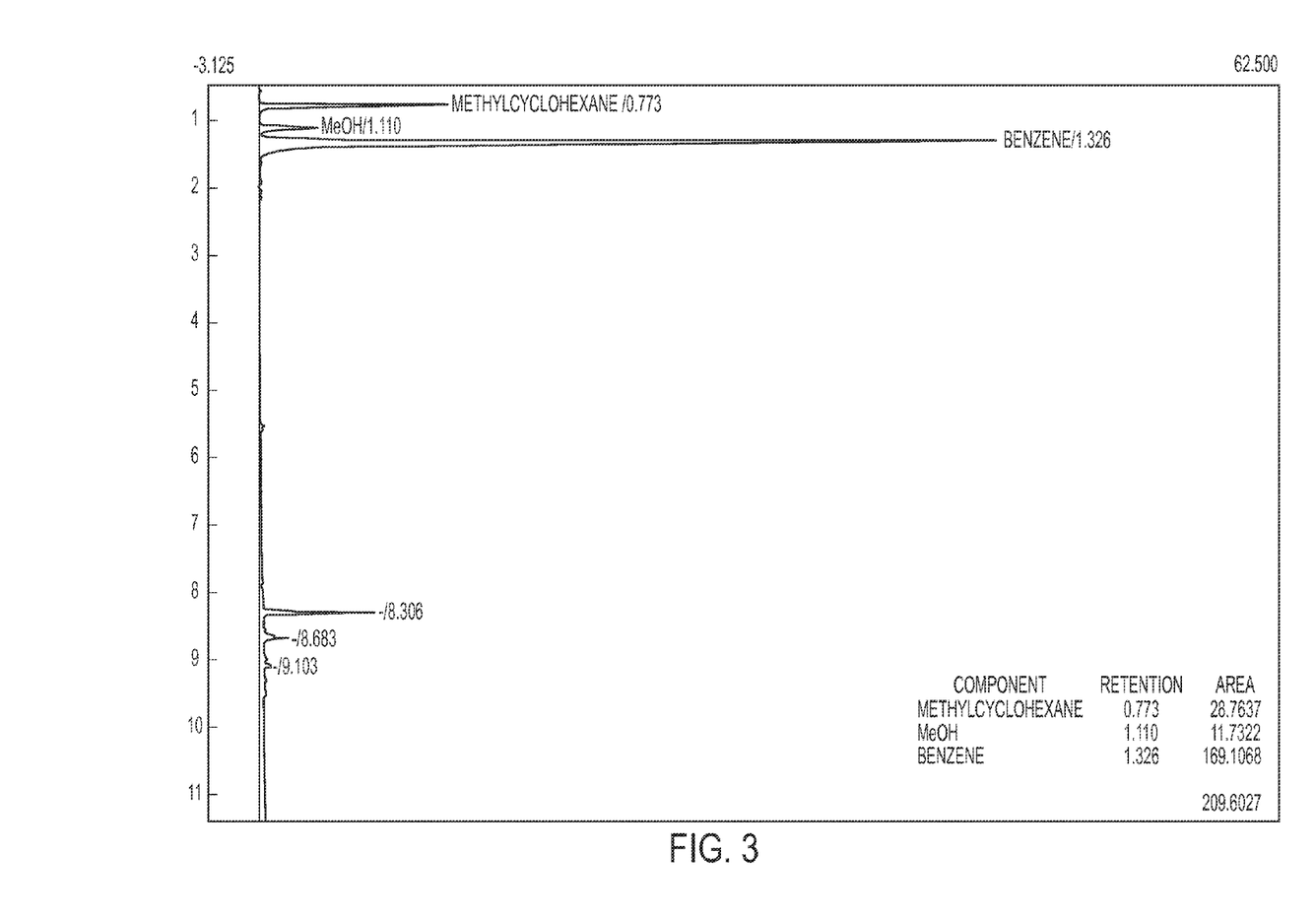
FIG. 3 shows a gas chromatogram spectra of process water before purification treatment.
Figure 4:
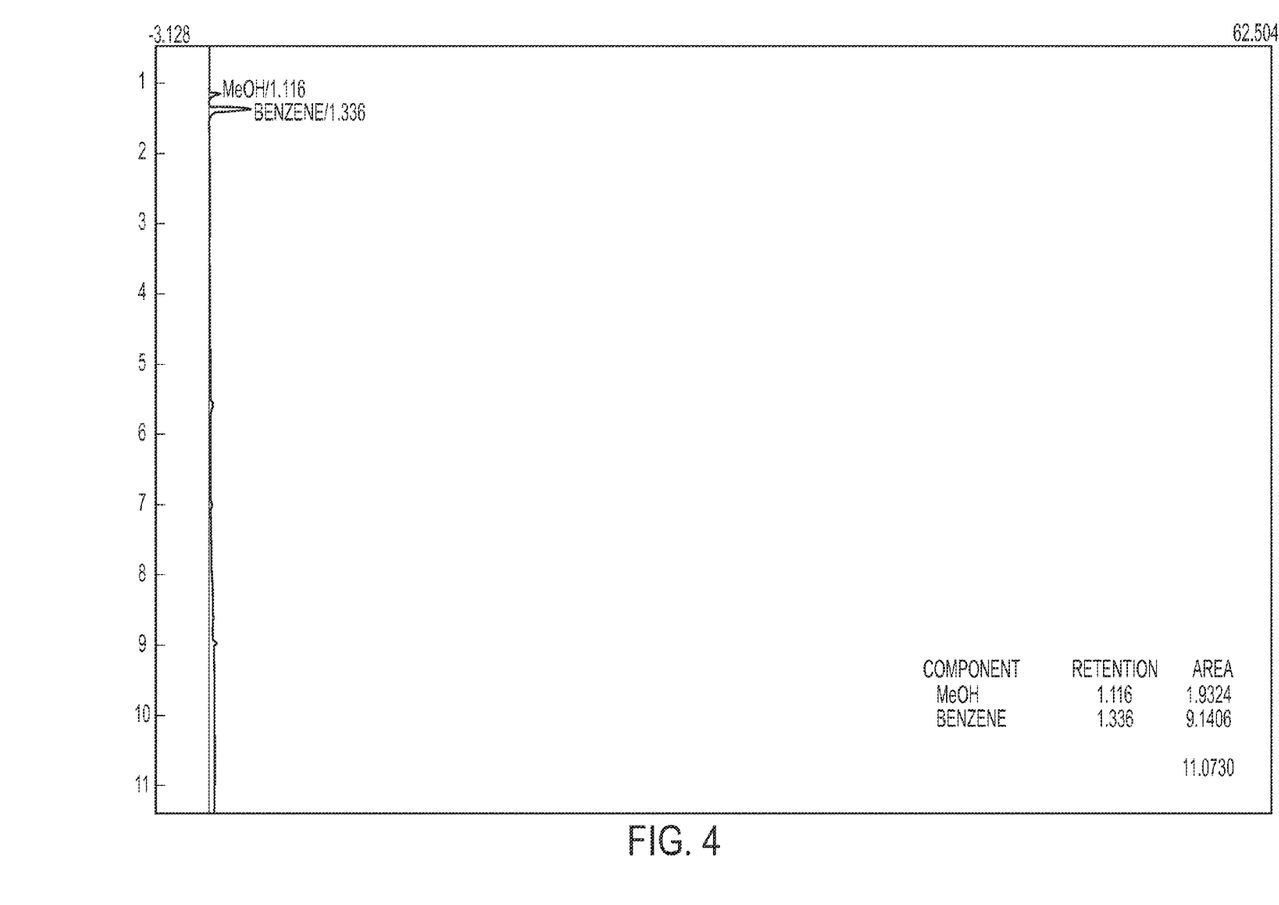
FIG. 4 shows a gas chromatogram spectrum of process water after purification treatment in accordance with one embodiment of the present invention applied for 30 minutes.

An indication of the effectiveness of the present treatment is shown by gas chromatographic spectra of FIGS. 3 and 4. FIG. 3 shows process water obtained directly after a catalytic conversion process. The sample has been spiked with 100 ppm methanol. Significant amounts of benzene (exceeding 1000 ppm) are found along with noticeable amounts of methylcyclohexane as well as high boiling components. Using a corn-derived biochar activated to 950 $m^2/g$ for 30 minutes in a process in accordance with the present application, it is evident that all the methylcyclohexane and all the high boiling components can be removed. The benzene levels have been reduced by over 2 orders of magnitude.

Further boiling reduced the benzene levels even further, to below the resolution of the instrument.

Upon review of the description and embodiments of the present invention, those skilled in the art will understand that modifications and equivalent substitutions may be performed in carrying out the invention without departing from the essence of the invention. Thus, the invention is not meant to be limiting by the embodiments described explicitly above, and is limited only by the claims which follow.

What is claimed is:

1. A method for removing contaminants from process water comprising:
   pyrolyzing biomass to produce gaseous compounds and biochar;
   gasifying the biochar from the pyrolysis process to create an adsorptive medium; and
   treating a process water comprising one or more of organic contaminants, inorganic contaminants or particulate contaminants by passing the process water through the adsorptive medium to remove one or more of organic contaminants, inorganic contaminants or particulate contaminants to produce treated process water.

2. The method of claim 1 further comprising gasifying organic contaminants adsorbed on the adsorptive medium.

3. The method of claim 2 wherein the gaseous compounds and biochar resulting from the pyrolyzing step are substantially uncontaminated.

4. The method of claim 2 wherein the minerals content of the biochar in the adsorptive medium increases after gasifying organic contaminants adsorbed on the adsorptive medium.

5. The method of claim 1 wherein the biomass is pyrolyzed in a pyrolysis reactor selected from the group consisting of fixed bed reactors, fluidized bed reactors, circulating bed reactors, bubbling fluid bed reactors, vacuum moving bed reactors, entrained flow reactors, cyclonic or vortex reactors, rotating cone reactors, auger reactors, ablative reactors, microwave or plasma assisted pyrolysis reactors, and vacuum moving bed reactors.

6. The method of claim 1 wherein the biomass is provided as thin sheets.

7. The method of claim 6 wherein the biomass is pyrolyzed by applying pressure shocks and temperature ramps to the thin sheets of biomass.

8. The method of claim 1 wherein the treated process water contains less than 1% hydrocarbons.

9. The method of claim 8 wherein the treated process water contains less than 1% aromatic hydrocarbons.

10. The method of claim 9 wherein the treated process water contains less than 100 ppm aromatic hydrocarbons.

11. The method of claim 10 wherein the treated process water contains less than 1 ppm aromatic hydrocarbons.

12. The method of claim 1 wherein the process water is contaminated with inorganic compounds.

13. The method of claim 1 wherein the adsorptive medium is activated in situ.

14. The method of claim 1 wherein the adsorptive medium comprises biochar having a surface area varying from 0.1 $m^2/g$ to 500 $m^2/g$.

15. The method of claim 1 wherein waste heat from pyrolyzing the biomass is used in the step of treating the process water.

16. A biochar recycling system for treatment of water produced from biomass conversion to fuels comprising:
   a pyrolyzer capable of pyrolyzing biomass to produce gaseous compounds and biochar;
   a water treatment system for removing impurities from process water, wherein the water treatment system comprises an adsorptive medium comprising biochar; and
   a gasification system for gasifying the removed impurities.

17. The system according to claim 16 wherein the water treatment system comprises a heating device capable of increasing the temperature of the process water to remove light organic impurities.

18. The system according to claim 16 wherein the gaseous compounds and biochar exit the pyrolyzer in substantially uncontaminated form.

19. The system according to claim 16 wherein the biochar produced by the system has a surface area varying from 0.1 $m^2/g$ to 500 $m^2/g$.

20. The system according to claim 16 wherein the process water after treatment contains less than 1% hydrocarbons.

21. The system according to claim 20 wherein the process water after treatment contains less than 1% aromatic hydrocarbons.

22. The system according to claim 21 wherein the process water after treatment contains less than 100 ppm aromatic hydrocarbons.

23. The system according to claim 22 wherein the process water after treatment contains less than 1 ppm aromatic hydrocarbons.

24. The system according to claim 16 wherein the process water before treatment is contaminated with inorganic compounds.

25. The system according to claim 16 wherein the adsorptive medium is activated in situ.

26. The system according to claim 16 wherein the gasification system decomposes adsorbed contaminants in the process water.

27. The system according to claim 17 wherein the light organic impurities are directed to the gasifier.

* * * * *